United States Patent [19]

Sealey

[11] 4,228,975
[45] Oct. 21, 1980

[54] KNEELING NOSE LANDING GEAR ASSEMBLY

[75] Inventor: Francis Sealey, Bellevue, Wash.

[73] Assignee: The Boeing Company, Seattle, Wash.

[21] Appl. No.: 43,060

[22] Filed: May 29, 1979

[51] Int. Cl.³ ............................................. B64C 25/14
[52] U.S. Cl. ................................................. 244/102 R
[58] Field of Search ....... 244/102 R, 102 SS, 102 SL, 244/104 R, 104 FP, 109, 50

[56] References Cited

U.S. PATENT DOCUMENTS

| | | | |
|---|---|---|---|
| 2,544,855 | 3/1951 | Parker | 244/102 R |
| 2,565,007 | 8/1951 | Van Zelm et al. | 244/102 R |
| 2,575,647 | 11/1951 | Winslow | 244/102 R |
| 2,690,888 | 10/1954 | Hawkins | 244/102 R |
| 3,335,981 | 8/1967 | Pauli et al. | 244/102 R |
| 3,580,531 | 5/1971 | Bock et al. | 244/102 R |
| 3,904,153 | 9/1975 | Watts | 244/50 |
| 3,954,232 | 5/1976 | Harper | 244/102 R |

*Primary Examiner*—Barry L. Kelmachter
*Attorney, Agent, or Firm*—Christensen, O'Connor, Johnson & Kindness

[57] ABSTRACT

A kneeling nose landing gear assembly for an airplane enables the nose of the airplane fuselage to be lowered to facilitate loading and unloading of cargo. A pair of hydraulic kneeling actuators pivotally coupled to the midsection of a pivotable landing gear strut are selectively positionable against a pair of retractable stop assemblies positioned above the strut. The actuators are pressurized against the cooperable stop assemblies to thereby cushion the descent of the airplane nose to a lowered position wherein the landing gear strut is pivoted forwardly into an angled kneeling position intermediate between an upright taxiing position and a retracted position. The kneeling actuators are subsequently pressurized to raise the nose of the airplane and swing the landing gear strut back into the taxiing position from the kneeling position. The kneeling actuators and their associated elements for providing the kneeling capability of the landing gear may be retrofitted to existing nose landing gear assemblies with negligible modification of the landing gear and without interfering with normal retraction or extension of the landing gear.

5 Claims, 6 Drawing Figures

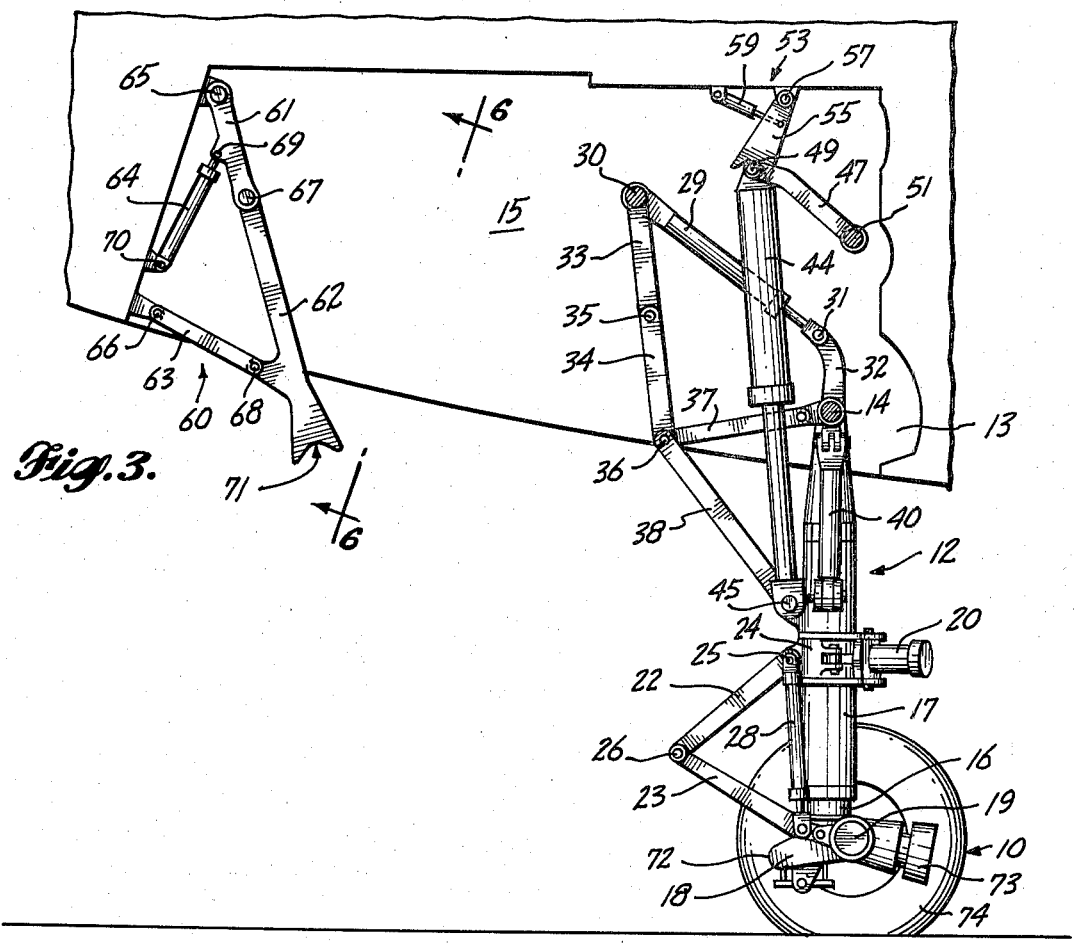

KNEELING NOSE LANDING GEAR ASSEMBLY

BACKGROUND OF THE INVENTION

This invention relates generally to airplane landing gear assemblies and particularly to kneelable nose landing gear assemblies whereby the nose of an airplane fuselage may be lowered during cargo loading operations.

In various commercial jet airplanes, cargo is loaded and unloaded from the airplane through a door in the nose of the fuselage. In such airplanes it is desirable that the fuselage nose have the capability of being lowered to facilitate cargo loading operations. In particular, it is desirable that certain commercial airplanes currently in use be retrofitted with a device providing such a kneeling capability. For example, in prposed commercial cargo versions of the Boeing 747 airplane, which has a nose cargo door sixteen feet above the ground, it has been sought to facilitate front end loading by means of a kneelable nose landing gear assembly.

It has also been sought to employ a kneeling landing gear assembly whereby the nose of the airplane fuselage may be rigidly and securely supported during cargo loading operations. Particularly during loading and unloading of heavy cargo packages, for example motor vehicles, it is desirable that momentary weight loads on the nose landing gear assembly not be borne entirely by the nose landing wheel and the landing gear shock absorber assembly. To facilitate safe and efficient loading of heavy cargo packages, it is desirable that the nose of the fuselage be rigidly supported from below and not be subject to vertical bouncing or sponginess due to the inherent flexibility of the nose landing wheel and the shock absorber assembly.

Devices heretofore available for providing kneeling capability to nose landing gear assemblies have not met with commercial acceptance for a number of reasons. First, such devices are not retrofittable onto existing commercial jet airplanes. More particularly, they are not retrofittable onto airplanes having forwardly retracting landing gear assemblies. Secondly, such devices do not, in and of themselves, provide a means for rigidly supporting the fuselage nose or for limiting the weight load on the landing wheel and the shock absorber assembly while the nose is in a lowered position.

Accordingly, it is an object of the present invention to provide a kneeling nose landing gear assembly for modern commercial airplanes.

It is a further object of the present invention to provide a device which may be retrofitted onto existing nose landing gear assemblies to add kneeling capability of such assemblies.

It is another object of the present invention to provide a device which provides kneeling capability to a conventional landing gear assembly without interfering with the normal operation of the landing gear assembly.

It is yet another object of the present invention to provide a kneeling nose landing gear assembly which rigidly supports the fuselage nose and limits the weight load on the nose landing wheel and shock absorber assembly when the nose of the airplane is in a kneeling position.

SUMMARY OF THE INVENTION

The present invention consists generally of an airplane nose landing gear assembly which depends from the underside of an airplane fuselage nose. The landing gear assembly includes one or more landing wheels journalled to the lower end of a shock absorber strut. The upper end of the strut is pivotably attached to the fuselage in a manner whereby the strut and landing wheels are pivotable through a vertical plane during retraction and extension of the landing gear. The wheels and shock strut may be deployed in any one of three operational positions. During flight, the wheels and shock strut are swung upwardly into a retracted position within a wheel bay in the nose of the airplane. During landing or taxiing of the airplane, the wheels and shock strut are swung downwardly into an upright taxiing position. During loading or unloading of cargo through the fuselage nose, the wheels and the shock strut may be swung from the vertical taxiing position into the third, or kneeling, position wherein the strut is extended at an angle with respect to the upright position and wherein the wheels and shock strut are in a position intermediate between the fully retracted position and the fully extended vertical taxiing position. In the kneeling position, the nose of the aircraft is several feet lower than it is with the landing gear in the taxiing position, thereby facilitating cargo loading with conventional loading equipment.

Pivoting the wheels and shock strut between the fully retracted position and the fully extended taxiing position is accomplished by a conventional hydraulic retraction actuator of the type presently employed in commercial jet airplanes. Pivoting the wheels and shock strut into the kneeling position from the taxiing position is accomplished by the combined operation of the conventional retraction actuator and a hydraulic kneeling actuator assembly which is engaged only during deployment of the landing gear assembly to or from the kneeling position. The kneeling actuator assembly is not used during routine pivoting of the landing gear between the fully retracted position and the fully extended taxiing position, as in preparation for landing or immediately after take-off. The hydraulic kneeling actuator assembly and an associated load-bearing assembly may be independently retrofitted onto preexisting landing gear assemblies without interference with the preexisting retraction actuator or other elements of the landing gear assembly.

BRIEF DESCRIPTION OF THE DRAWINGS

FIG. 3 is a side view showing the landing gear assembly in a fully extended taxiing position with the strut extension limiter installed and the kneeling actuators engaged in preparation for kneeling.

FIG. 4 is a side view showing the landing gear assembly in a kneeling position.

DETAILED DESCRIPTION OF THE PREFERRED EMBODIMENT

Figure 1:
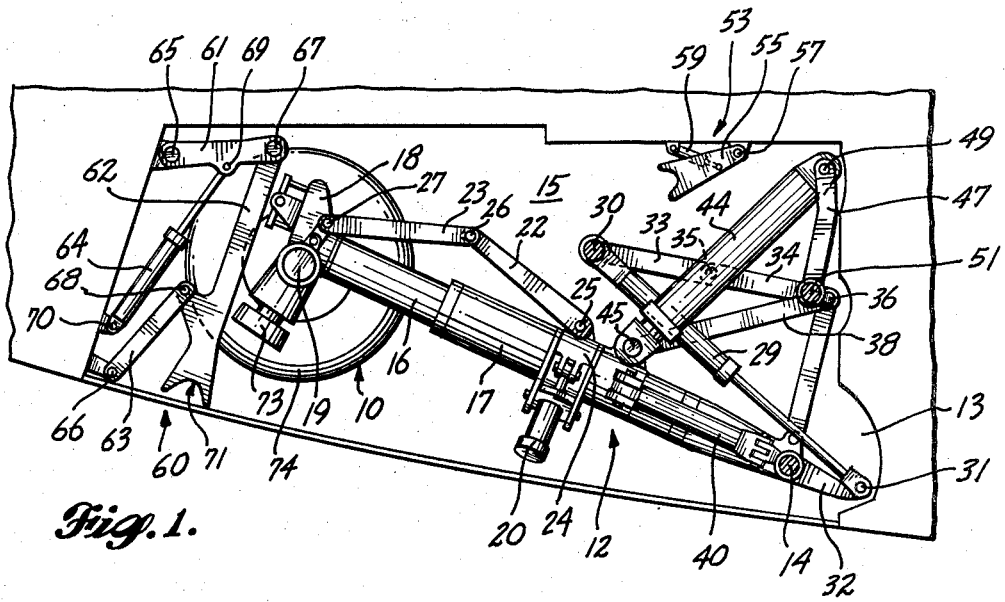
FIG. 1 is a side view in partial cross-section showing the preferred embodiment of the landing gear assembly of the present invention in a fully retracted position within the wheel bay of an airplane fuselage.

Referring to FIGS. 1 through 5, the preferred embodiment of the kneeling nose landing gear assembly is shown in various positions of deployment. The forwardly-folding landing gear assembly includes generally a pair of landing wheels 10 and 11 journalled to the lower end of a shock absorber strut 12. The strut 12 is pivotably attached at its upper end to the airplane fuselage frame 13 by means of a transverse pivot shaft 14. The landing gear assembly may be deployed into any one of three operational positions by swinging the shock absorber strut 12 and landing wheels 10 and 11 about the pivot shaft 14. In the fully retracted position, illustrated in FIG. 1, the landing gear assembly is swung forwardly up into a recessed wheel bay 15 for storage during flight. During landing or taxiing of the airplane, the landing gear assembly is deployed downwardly into a fully extended taxiing position, illustrated in FIGS. 2, 3 and 5. During loading of cargo, the landing gear assembly may be deployed into the third, or kneeling position, illustrated in FIG. 4.

The shock absorber strut 12 includes telescoping inner and outer shock strut cylinders 16 and 17, respectively. The outer cylinder 17 is pivotable about pivot shaft 14 by means of a T-shaped pivot shaft housing 17a (best seen in FIG. 5) secured to the upper end of cylinder 17. The inner cylinder 16 is slidable axially within the outer cylinder 17 and is also rotatable within the outer cylinder 17 to provide steering of the wheels 10 and 11. The lower protruding end of the inner cylinder 16 is attached to an axle housing 18. The wheels 10 and 11 rotate on an axle shaft 19 which extends transversely through the axle housing 18. A shock absorbing mechanism (not shown) within the telescoping cylinders 16 and 17 absorbs shock transmitted to the fuselage frame 13 from the wheels 10 and 11. The shock absorbing mechanism also limits the axial displacement of the inner cylinder 16 within the outer cylinder 17.

A pair of steering actuators 20 and 21 are secured to the outer cylinder 17 near its midpoint. These actuators 20 and 21 consist of conventional linearly extensible hydraulic actuators which provide steerage to the wheels 10 and 11 through a pair of flexible torsion link arms 22 and 23. Linear force produced by the steering actuators 20 and 21 is translated into torque about the nonrotatable outer cylinder 17 of the shock strut 12 by means of a rotatable ring 24 to which the moveable ends of the actuators are attached. The ring 24 rotates about the outer cylinder 17 and transmits torque to the axle housing 18 by means of the torsion link arms 22 and 23. The upper torsion link arm 22 is connected to the ring 24 by means of a pivot pin 25. The two arms 22 and 23 are connected by a pivot pin 26. The lower arm 23 is connected to the axle housing 18 by a third pivot pin 27. The three pins 25, 26 and 27 enable the arms 22 and 23 to flex freely in a vertical plane and yet also operate to transmit torque to the axle housing 18, thereby maintaining steering control without impeding axial motion of the inner strut cylinder 16 during shock absorption.

Referring to FIGS. 3 and 4 in particular, a strut extension limiter 28 is installable on the strut 12 between pivot pins 25 and 27 to limit the extension of the telescoping inner cylinder 16 to a predetermined length during the kneeling operation described below. The strut extension limiter 28 is manually installed prior to kneeling of the landing gear assembly by attaching it to extensions of the pivot pins 25 and 27. The extension limiter 28 is subsequently removed at such time as the landing gear assembly is returned to the taxiing position.

Figure 2:
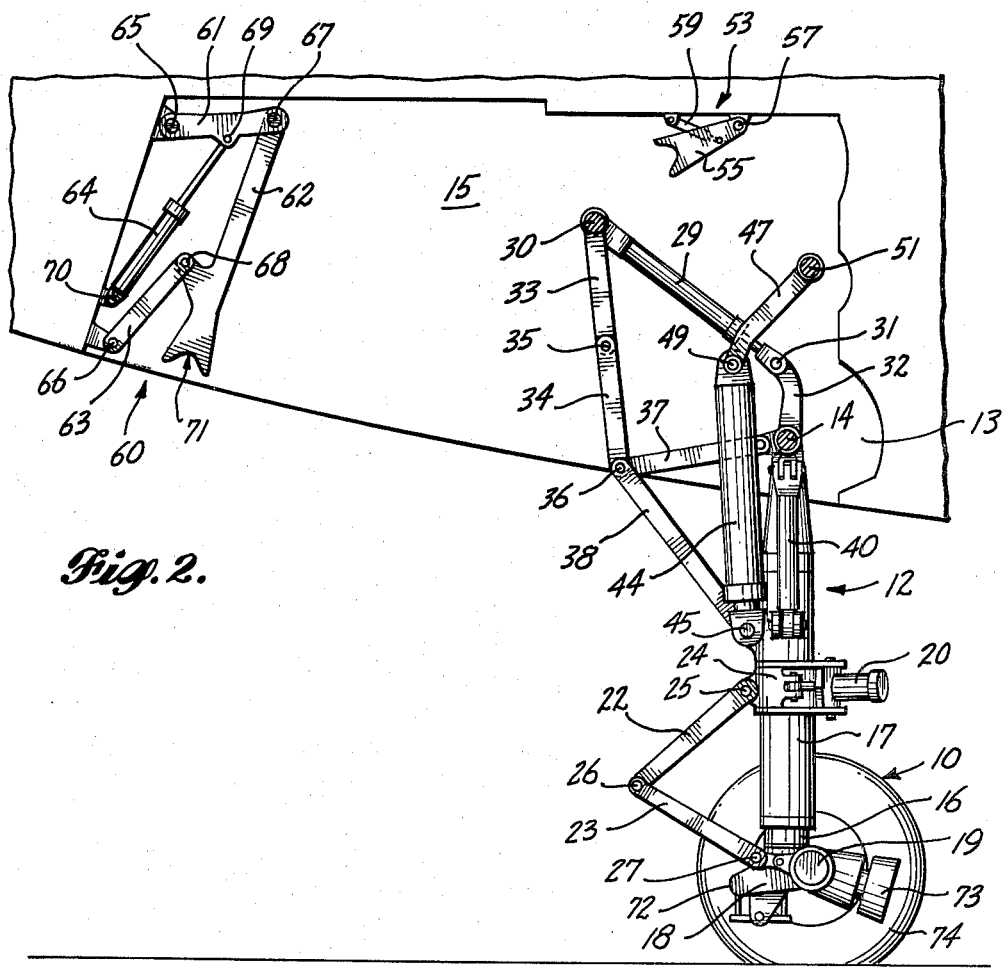
FIG. 2 is a side view showing the landing gear assembly in a fully extended taxiing position with the kneeling actuators disengaged.
Figure 5:
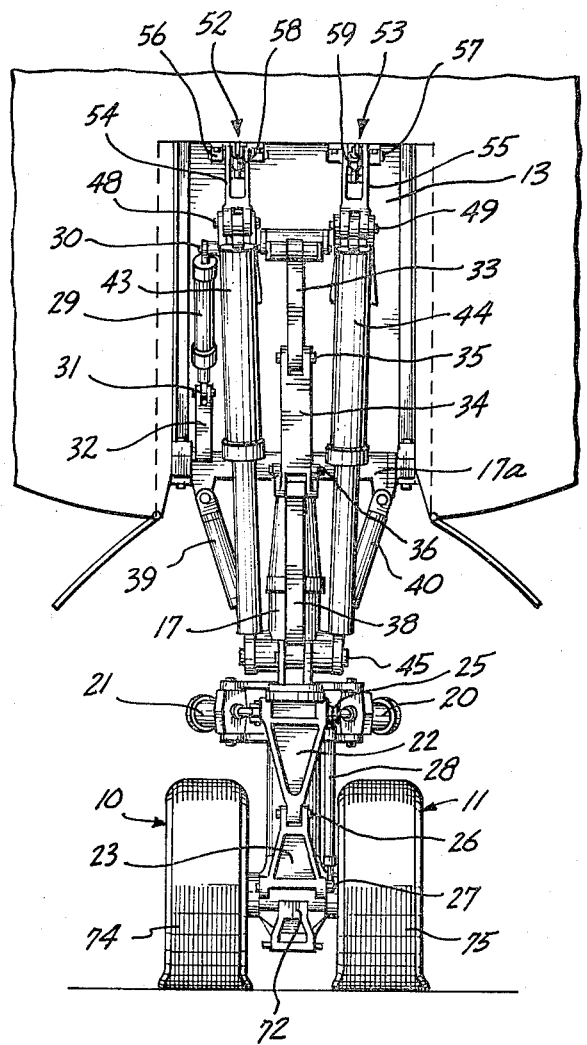
FIG. 5 is a front view showing the landing gear assembly in a fully extended taxiing position with the strut extension limiter installed and the kneeling actuators engaged in preparation for kneeling.

Deployment of the landing gear assembly between the retracted position shown in FIG. 1 and the taxiing position shown in FIGS. 2, 3 and 5 is accomplished by means of a retraction actuator 29. The retraction actuator 29 is a conventional, linearly extensible, hydraulic actuator. One end of the actuator 29 is connected to the airplane fuselage frame 13 by a pivot pin 30. The other end of the actuator 29 is connected by a second pivot pin 31 to an extension arm 32 which extends radially with respect to pivot shaft 14 from one end of the T-shaped pivot shaft housing 17a. The landing gear assembly may be placed in the retracted position by exerting a force on the extension arm 32 to pivot the entire landing gear assembly into the retracted position shown in FIG. 1. To extend the landing gear assembly downwardly from the retracted position, the actuator 29 is retracted to swing the strut 12 and wheels 10 and 11 in a counterclockwise direction about the pivot shaft 14 and lower the assembly from the wheel bay 15 to the upright, fully extended taxiing position shown in FIG. 2.

Upon being swung downwardly into the taxiing position, the landing gear assembly is locked into the fully extended, upright position by a pair of locking arms 33 and 34 which form part of a conventional over-center locking mechanism (not shown). The locking arms 33 and 34 are pivotably connected to one another by means of a pivot pin 35. The upper end of the upper locking arm 33 is pivotably connected to the fuselage frame 13 by means of pivot pin 30, and the lower end of lower locking arm 34 is pivotably connected by a pivot pin 36 to the apex of a rigid triangle formed by two support arms 37 and 38 extending from the outer shock strut cylinder 17. A hydraulic delocking mechanism, not shown, at pivot pin 35 between locking arms 33 and 34 serves to unlock the arms 33 and 34 during retraction of the landing gear assembly by initiating folding of the arms 33 and 34 at pivot pin 35. The rigid triangle formed by arms 37 and 38, together with the locking arms 33 and 34, stabilizes the landing gear assembly against stresses longitudinal to the axis of the fuselage. The shock strut 12 is further stabilized against lateral stresses by diagonal braces 39 and 40 which connect the outer ends of the T-shaped pivot shaft housing 17a with the shock cylinder 17 near its mid-point.

Deployment of the landing gear assembly into the kneeling position illustrated in FIG. 4 from the taxiing position illustrated in FIG. 2 is accomplished by means of a pair of linearly extensible, hydraulic kneeling actuators 43 and 44. As shown in FIG. 2, for example, the kneeling actuators 43 and 44 are connected at their lower ends to the outer shock strut cylinder 17 near its mid-point by a common pivot pin 45. The upper ends of the kneeling actuators 43 and 44 are pivotably connected to the respective ends of a pair of idler arms 46 and 47 by means of pivot pins 48 and 49, respectively. The idler arms 46 and 47 are also pivotably connected at their opposite ends to the fuselage frame 13 by means of pivot pins 50 and 51, respectively. The idler arms 46 and 47 thus operate to constrain the movement of the upper ends of the kneeling actuators 43 and 44 through predetermined arcs of rotation defined by the lengths of the idler arms 43 and 44. The upper ends of the kneeling actuators 43 and 44 move through these arcs whenever the actuators 43 and 44 are hydraulically extended, as well as whenever the actuators 43 and 44 are moved as a result of deployment of the landing gear assembly from one position to another.

Two kneeling actuator stop assemblies 52 and 53 are selectively positionable within the above-mentioned predetermined arcs of movement of the upper ends of kneeling actuators 43 and 44. The stop assemblies 52 and 53 include support cradles 54 and 55, respectively, which, when interposed in the arcs of movement of the upper ends of actuators 43 and 44, arrest the upward arcuate movements of the upper ends of actuators 43 and 44. The support cradles 54 and 55 are pivotable about pivot pins 56 and 57 by means of small hydraulic actuators 58 and 59, respectively.

Deployment of the landing gear assembly into the kneeling position is accomplished in several steps. Such deployment is always initiated from the taxiing position illustrated in FIG. 2, with the strut extension limiter installed wherein the kneeling actuators 43 and 44 are initially depressurized and retracted, and the stop assemblies 52 and 53 are in their retracted positions. To prepare the landing gear assembly for kneeling, the support cradles 54 and 55 are first pivoted into position to receive the upper ends of kneeling actuators 43 and 44. The kneeling actuators 43 and 44 are then pressurized and extended until their upper ends move upwardly and arcuately into engagement with the support cradles 54 and 55, as shown in FIG. 3. It will be seen that the upper ends of the kneeling actuators 43 and 44 are guided into engagement with the support cradles 54 and 55 by means of the idler arms 46 and 47, respectively.

Figure 6:
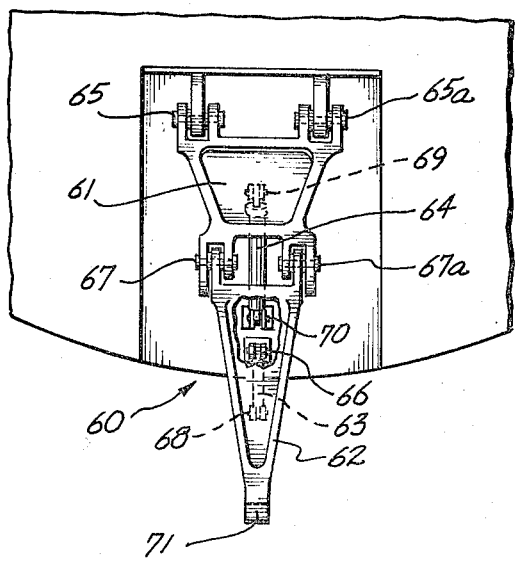
FIG. 6 is a rear view taken along line 6—6 of FIG. 3 of the load support assembly located at the front of the wheel bay.

Preparation of the landing gear assembly for kneeling motion further requires deployment of a load support assembly 60, illustrated in particular in FIG. 6. The load support assembly 60 consists of linked structural support members 61, 62 and 63 and a hydraulic actuator 64. The upper support member 61 is pivotably connected to the fuselage frame 13 by means of pins 65 and 65a, respectively. Lower support member 63 is also pivotably connected to the fuselage frame 13 by a pin 66. The middle support member 62 is pivotably connected to the upper member 61 by means of two pivot pins 67 and 67a and to the lower support member 63 by a pin 68. The actuator 64 is pivotably connected to the central web of upper support member 61 by means of a pivot pin 69 and is pivotably connected at its opposite end to the fuselage frame 13 by means of a pivot pin 70. The entire load support assembly 60 is normally kept in a compact retracted position within the wheel bay 15 of the airplane, as shown in FIGS. 1 and 2. During preparation for kneeling, the actuator 64 is retracted to deploy the load support assembly 60, and the middle support member 62 in particular, downwardly such that the middle support member 62 is positioned beneath the fuselage of the airplane, as shown in FIGS. 3 and 6. In this position, a curved receiving surface 71 at the lower end of support member 62 is positioned to receive a cooperable axle housing support shaft 72 secured to the axle housing 18 as the landing gear assembly is swung into the kneeling position shown in FIG. 4.

Preparation of the landing gear assembly for kneeling is completed by manually installing the strut extension limiter 28 on the strut 12 to ensure that the axle housing support shaft 72 will be properly positioned for engaging the receiving surface 71 of the load support linkage 60.

With the kneeling actuators 43 and 44 pressurized against the support cradles 54 and 55 and the load support assembly 60 deployed, the landing gear assembly may be pivoted from the taxiing position of FIG. 3 to the kneeling position of FIG. 4. This kneeling movement is initiated by pressurizing the retraction actuator 29 to pivot the landing gear assembly a small amount and pressurizing the hydraulic kneeling actuators 43 and 44 to cushion the descent of the fuselage nose into the kneeling position.

With the landing gear assembly in the kneeling position of FIG. 4, the weight of the airplane nose is borne primarily by the kneeling actuators 43 and 44 and the load support linkage 60. The shock absorber mechanism in the strut 12 is rendered inoperative in this position by way of the extensible inner strut cylinder 16 being engaged against the receiving surface 71 of the load support assembly 60, thus causing the nose to be more rigidly supported.

A tire load limiter 73 operates to limit the weight load borne by tires 74 and 75 of the landing wheels 10 and 11 when the landing gear assembly is in the kneeling position. The tire load limiter 73 is secured to and extends from the axle housing 18. The load limiter 73 extends radially with respect to the wheel axle shaft 19 and projects at an obtuse angle with respect to the landing gear strut 12. When the landing gear assembly is in the taxing position, the tire load limiter 73 thus projects rearwardly and is inoperative, as shown in FIG. 2 for example. As the landing gear assembly is pivoted into the kneeling position, tire load limiter 73 projects downwardly almost to the ground, as shown for example in FIG. 4. In this position, the tire load limiter 73 protects the tires 74 and 75 from excessive weight loads and also serves to stabilize the nose of the airplane by reducing sponginess and bouncing which may arise from the inherent flexibility of the tires 74 and 75.

Although the present invention is described and illustrated herein by reference to a preferred embodiment, it will be understood that various modifications, substitutions and alterations may be made by one of ordinary skill in the art without departing from the spirit of the invention, and that the scope of the present invention is, accordingly, defined by the following claims.

The embodiments of the invention in which an exclusive property or privilege is claimed are defined as follows:

1. A kneeling nose landing gear assembly for an airplane having a fuselage frame comprising:
   a landing gear strut having an upper and a lower end, means pivotably coupling said upper end of said strut to said fuselage frame for swinging movement between a retracted position within a wheel bay and an upright taxiing position wherein said strut extends downwardly from said airplane, said strut having wheel means journalled to said lower end of said strut;
   retraction actuator means operatively coupled between said strut and said frame for selectively swinging said strut between said taxiing position and said retracted position;
   kneeling actuator means having a first end and a second end, means coupling said first end of said kneeling actuator means to said landing gear strut, idler arm means having a first end and a second end, said first end of said idler arm means being pivotably coupled to said frame of said airplane, means pivotably coupling said second end of said idler arm means to said second end of said kneeling actuator means, said second end of said kneeling actuator means being thereby constrained by said idler arm means to swing through a predetermined arc, and;

stop means operatively coupled to said frame of said airplane and movable between an operable position wherein said stop means is interposed in said predetermined arc for receiving said second end of said kneeling actuator means and an inoperable position wherein said stop means is removed from said predetermined arc thereby permitting said second end of said kneeling actuator means to swing freely through said predetermined arc as said strut is moved between said taxiing and said retracted positions by said retraction actuator means, said stop means in said operable position and said kneeling actuator means being cooperable to support said strut in a kneeling position intermediate between said upright taxiing position and said retracted position, said kneeling actuator means being forcibly extensible against said stop means in said operable position and thereby operable to cushion the descent of the nose of the airplane as said strut is pivoted from said taxiing position into said kneeling position, said kneeling actuator means and said stop means being further cooperable to augment said retraction actuator means to raise the nose of the airplane by pivoting said strut from said kneeling position to said taxiing position.

2. The kneeling nose landing gear assembly of claim 1 wherein said landing gear strut includes outer and inner shock absorber cylinders at said upper and lower ends of said strut, respectively, said cylinders being coaxially slidable with respect to one another and having shock absorber means contained therein for absorbing shock during landing and taxiing of said airplane, said outer shock absorber cylinder having an upper end and a lower end, said upper end of said outer cylinder being pivotably coupled to said fuselage frame, said inner cylinder protruding from said lower end of said outer cylinder and terminating in a landing wheel axle housing at said lower end of said landing gear strut, said wheel means including a pair of landing wheels journalled to said landing wheel axle housing, said kneeling actuator means including a pair of linearly extensible hydraulic kneeling actuators each having first and second ends, said idler arm means including a pair of idler arms each having a first end and a second end, said first ends of said idler arms being pivotably coupled to said fuselage frame and said second ends of said idler arms being pivotably coupled respectively to said second ends of said kneeling actuators, said first ends of said kneeling actuators being pivotably coupled to said outer shock absorber cylinder, said stop means including a pair of selectively actuatable stop assemblies operable to engage respectively said second ends of said kneeling actuators for supporting said landing gear strut in said kneeling position.

3. The landing gear assembly of claim 2 further comprising a load support means, said load support means being generally positioned at a position within said wheel bay opposite said upper end of said landing gear strut, said load support means being selectively actuatable to deploy a rigid load support member interposed in supportive relationship between said landing gear axle housing and said fuselage frame when said strut and said landing wheels are in said kneeling position, said load support means being retractable into said landing wheel bay when not supporting said axle housing.

4. The landing gear assembly of claim 3 further comprising a manually removable strut extension limiter for limiting the longitudinal extension of said inner shock absorber cylinder during pivoting of said strut into said kneeling position, said strut extension limiter operating to maintain said strut and said axle housing in a position for cooperable engagement of said axle housing with said load support means, said strut extension limiter operably connecting said inner and outer shock absorber cylinders.

5. The landing gear assembly of claim 2 further comprising a tire load limiter for limiting the weight load borne by said landing wheels when said landing gear strut and said landing wheels are in said kneeling position, said load limiter projecting radially with respect to said landing wheels from said landing wheel axle housing, said load limiter being disposed from said axle housing at an obtuse angle with respect to said shock absorber strut whereby said load limiter is positioned substantially vertically when said strut and said landing wheels are in said kneeling position, said load limiter projecting from said axle housing by a distance less than the radius of said wheels.

* * * * *